United States Patent [19]

Kitano et al.

[11] Patent Number: 4,725,952
[45] Date of Patent: Feb. 16, 1988

[54] BRAKING DEVICE FOR USE IN VEHICLE

[75] Inventors: Yutaka Kitano, Shibuya; Yoshikazu Miyamoto, Kokubunji; Yoshimoto Ohta, Ichikawa; Tetsuo Haraikawa, Funabashi, all of Japan

[73] Assignee: Tokico Ltd., Kawasaki, Japan

[21] Appl. No.: 45,202

[22] Filed: May 4, 1987

Related U.S. Application Data

[63] Continuation of Ser. No. 664,295, Oct. 24, 1984, abandoned.

[30] Foreign Application Priority Data

Oct. 26, 1983 [JP] Japan ................... 58-200486

[51] Int. Cl.⁴ ......................... B60T 8/00; G06F 15/20
[52] U.S. Cl. ........................ 364/426; 303/97; 303/105
[58] Field of Search .............. 303/95, 97, 99, 109, 303/105, 107, 108; 364/426; 361/238; 180/179

[56] References Cited

U.S. PATENT DOCUMENTS

| 3,874,741 | 4/1975 | Schnaibel et al. | 303/106 |
|---|---|---|---|
| 4,320,460 | 3/1982 | Brearley et al. | 364/426 |
| 4,321,676 | 3/1982 | Ohmori et al. | 364/426 |
| 4,347,569 | 8/1982 | Allen, Jr. et al. | 364/426 |
| 4,395,761 | 4/1983 | Sato et al. | 364/426 |
| 4,409,664 | 10/1983 | Sharuada | 364/565 |
| 4,446,522 | 5/1984 | Sato et al. | 364/426 |
| 4,451,889 | 5/1984 | Bechmann et al. | 364/426 |
| 4,466,066 | 3/1984 | Saunweber et al. | 364/426 |
| 4,497,026 | 1/1985 | Bruschel et al. | 364/426 |
| 4,511,971 | 4/1985 | Dittner et al. | 364/426 |
| 4,550,372 | 10/1985 | Kahrs | 364/426 |
| 4,552,413 | 11/1985 | Fujii et al. | 303/106 |

FOREIGN PATENT DOCUMENTS

| 50-236 | 1/1975 | Japan | 364/426 |
|---|---|---|---|
| 57-70758 | 5/1982 | Japan . | |

Primary Examiner—Errol A. Krass
Assistant Examiner—Daniel W. Juffernbruch
Attorney, Agent, or Firm—Cushman, Darby & Cushman

[57] ABSTRACT

An anti-skid braking device for use in a vehicle comprising a braking mechanism for supplying a braking force to a wheel of the vehicle, a moderator for moderating the braking force supplied from the braking mechanism to the wheel for a moderation time interval in a case where the acceleration relevant to the rotation of the wheel reaches a predetermined negative angular acceleration value during supply of the braking force to the wheel by the mechanism.

4 Claims, 10 Drawing Figures

BRAKING DEVICE FOR USE IN VEHICLE

This is a continuation of application Ser. No. 664,295, filed Oct. 24, 1984, which was abandoned upon the filing hereof.

This invention concerns an anti-skid braking device for use in vehicles and, more particularly, it relates to an anti-skid braking device for use in vehicles having an anti-skid function.

Figure 1:
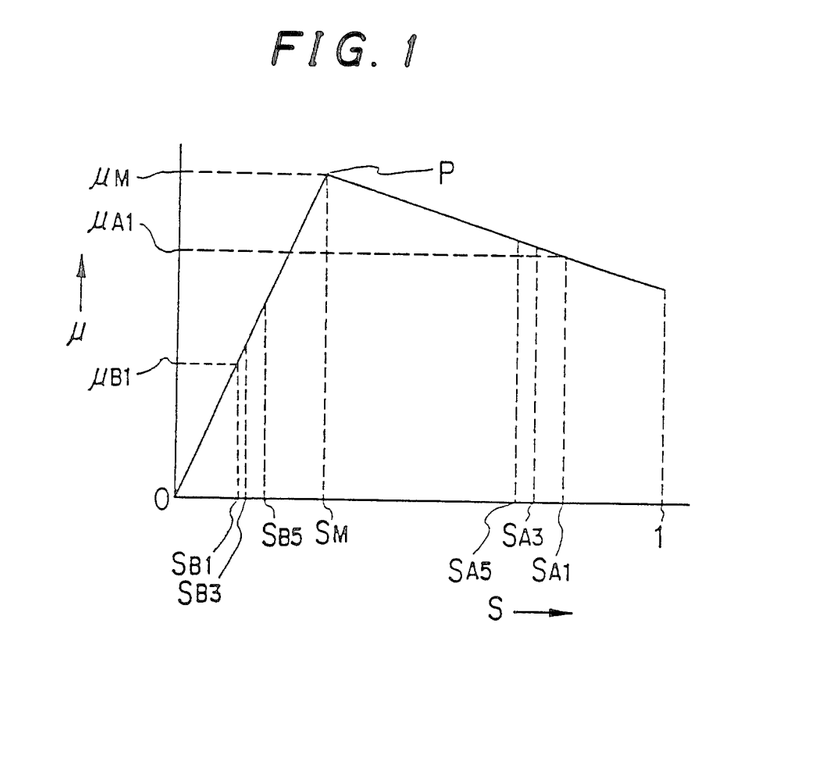
FIG. 1 is an explanatory view for the relationship between the slip factor and the frictional coefficient.

When the slip factor S is defined as:

$$S = \frac{V - R \cdot \omega}{V} \quad (1)$$

where V is the velocity of the vehicle body, R is the radius of the vehicle wheel and $\omega$ is the angular acceleration of the vehicle wheel, it is known that there is a relationship between the slip factor S and the frictional coefficient $\mu$ which results between the vehicle wheel and the road surface, this relation being generally as shown in FIG. 1. Accordingly, in order to avoid problems such as loss of steering performance, irregular swing of a vehicle body or the like due to the locking in the vehicle wheel, as well as to shorten the braking distance for the vehicle body in the braking operation for the vehicle, it is preferred to apply a braking action with a slip factor S=SM when the frictional coefficient $\mu$ takes the maximum value, i.e., $\mu$M, that is, at the slip factor at the point P in FIG. 1.

Since it is generally difficult to detect the actual frictional coefficient $\mu$ and the actual slip factor S directly, the prior art has been incapable of providing such a braking control capable of avoiding the lockings in the wheel based on these values. Therefore, various devices have been proposed with the intention to avoid the lockings in the wheel by using other values than those described above. However, the proposed devices are not completely satisfactory, in that they can not easily respond, for example, to the change in the increasing and the decreasing characteristics of the brake torque due to the change in the temperature of brake oils, that is, the change in the viscosity of the brake fluids, or to a change in the frictional coefficient.

This invention has been accomplished in view of the foregoing problems and the object thereof is to provide an anti-skid braking device for use in vehicles capable of effectively preventing the lockings in the vehicle wheel irrespective of the change in the viscosity of brake fluid or the change in the frictional coefficient, as well as shortening the braking distance as much as possible.

The foregoing objects can be attained by a braking device for use in vehicles comprising means for supplying a braking force to a vehicle wheel, and means for moderating the braking force supplied from the supply means to the vehicle wheel for a moderation time interval in a case where the angular acceleration of the vehicle wheel reaches a predetermined negative angular acceleration during supply of the braking force by the supply means to the vehicle wheel, the moderating means having means for measuring a reference time interval from a first time corresponding to the start of the moderation to a second time at which the angular acceleration of the wheel after the first time reaches at a predetermined value higher than the predetermined negative angular acceleration, the predetermined time interval being given by adding an addition time interval obtained by multiplying the reference time interval with a predetermined coefficient to said reference time interval.

This invention will now be explained hereinafter specifically by way of its preferred embodiments referring to the accompanying drawings, by which these and other objects, and features of this invention will be made more clear. However, it should be noted that this invention is no way limited only to the embodiments described below.

Figure 2:
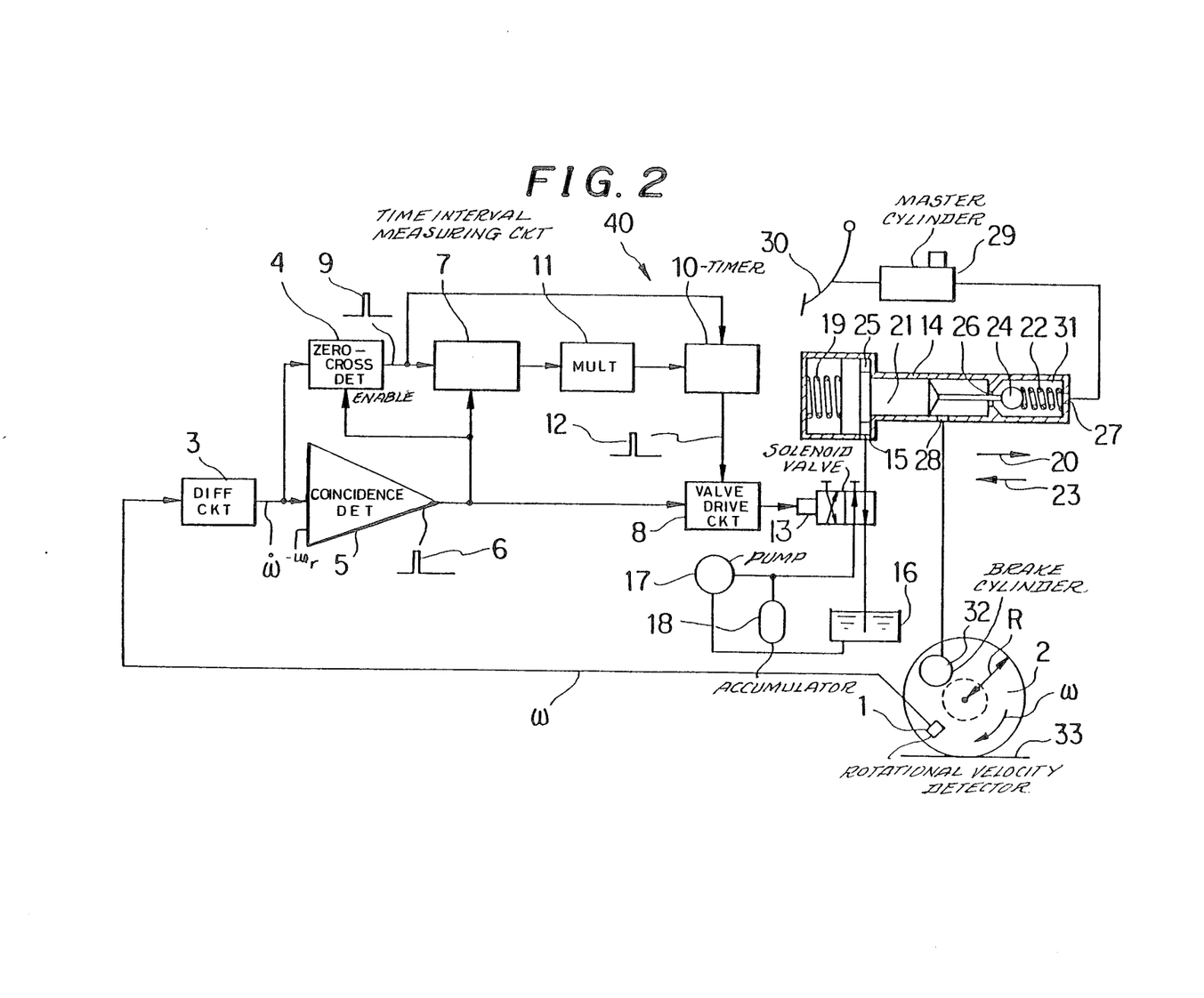
FIG. 2 is an explanatory view for a preferred embodiment according to this invention.

In FIG. 2, a rotational velocity detector 1 detects the angular velocity $\omega$ of a wheel 2 and supplies a voltage signal in proportion to the velocity $\omega$ to a differentiation circuit 3. The differentiation circuit 3 differentiates with respect to time the received voltage signal, to supply a voltage signal in proportion to the angular acceleration $\dot{\omega}$ of the wheel 2 to a zero-cross detector 4 and a coincidence detection circuit 5. The coincidence detection circuit 5 compares the voltage signal from the differentiation circuit 3 with a voltage corresponding to a predetermined negative angular acceleration $-\dot{\omega}r$ and, upon receiving a voltage signal indicating the angular acceleration $\dot{\omega} = -\dot{\omega}r$ from the differentiation circuit 3, supplies a signal 6 to the zero-cross detection circuit 4, a time interval measuring circuit 7 and a valve drive control circuit 8 respectively. The zero-cross detection circuit 4 detects a voltage corresponding to the angular acceleration $\dot{\omega} = 0$ on the signal from the differentiation circuit 3 after the reception of the signal 6 and supplies a signal 9 to the time interval measuring circuit 7 and a time detection circuit 10. The time interval measuring circuit 7 measures a interval T1 from the occurrence of the signal 6 to the occurrence of the signal 9 and supplies a signal indicating the interval T1 to a coefficient multiplier circuit 11. The coefficient multiplier circuit 11 multiplies a coefficient m by the signal indicating the time interval T1, that is, the circuit 11 executes the calculation of m×T1 (=T2), and supplies a signal corresponding to the thus obtained time interval T2 to the time detection circuit 10. As described later, while the coefficient m may be set variable, an appropriate fixed value can be selected therefor depending on the conditions of road in view of the frictional coefficient, as well as a manner of generation in the brake torque, that is, increasing and decreasing characteristics of the brake torque generated. For example, in the case of increasing and decreasing the brake torque linearly in a preferred embodiment described later, the coefficient m is preferably between about 0.8 to 1.2 and, more preferably, between about 0.9 to 1.1 under the usual conditions of the road. In this embodiment, it is assumed that the coefficient m is fixed to 1.

The time detection circuit 10 conducts the time counting operation after the generation of the signal 9, detects the elapse of time interval T2 indicated by the signal received from the coefficient multiplier circuit 11 in the time counting operation, and supplies a signal 12 to the valve drive control circuit 8. There is a certain time delay between the input of the signals 6 and 12, respectively, to the control circuit 8 and the actual operation of a solenoid valve 13. Accordingly, it is adapted such that the signals 6 and 12 are issued somewhat earlier in view of the time delay.

The control circuit 8 supplies an electric current to the solenoid valve 13 for a period from the occurrence of the signal 6 to the occurrence of the signal 12. The solenoid valve 13 communicates the port 15 of a valve 14 with an oil reservoir 16 when no current is supplied and communicates the port 15 with a fluid pressure generation pump 17 during supply of the current. Reference numeral 18 denotes an accumulator. The valve 14 comprises a piston 21 resiliently biased by a coil spring 19 in the direction of an arrow 20 and a ball 24 resiliently biased by a coil spring 22 in the direction of an arrow 23. In a case where no fluid pressure is supplied from the pump 17 to a chamber 25, the piston 21 causes the ball 24 to move against the resiliency of the spring 22 in the direction of the arrow 20 to open a channel 26 thereby communicating a port 27 with a port 28. While on the other hand, in a case where the fluid pressure is supplied from the pump 17 to the chamber 25, the piston 21 is displaced in the direction of the arrow 23 against the resiliency of the spring 19, whereby the channel 26 is closed by the ball 24 biased from the spring 22, to hinder the communication between the ports 27 and 28. The port 27 is in communication with a master cylinder 29 and, when a fluid pressure is generated from the master cylinder 29 by the actuation of a pedal 30, the fluid pressure is transmitted by way of the port 27 to a chamber 31. If the channel 26 being opened, the fluid pressure transmitted to the chamber 31 is transmitted by way of the port 28 to a brake cylinder 32 of the wheel 2.

The operation of the braking device 40 for use in vehicles constituted as described above will now be explained referring to FIG. 1 through FIG. 3.

Figure 3:
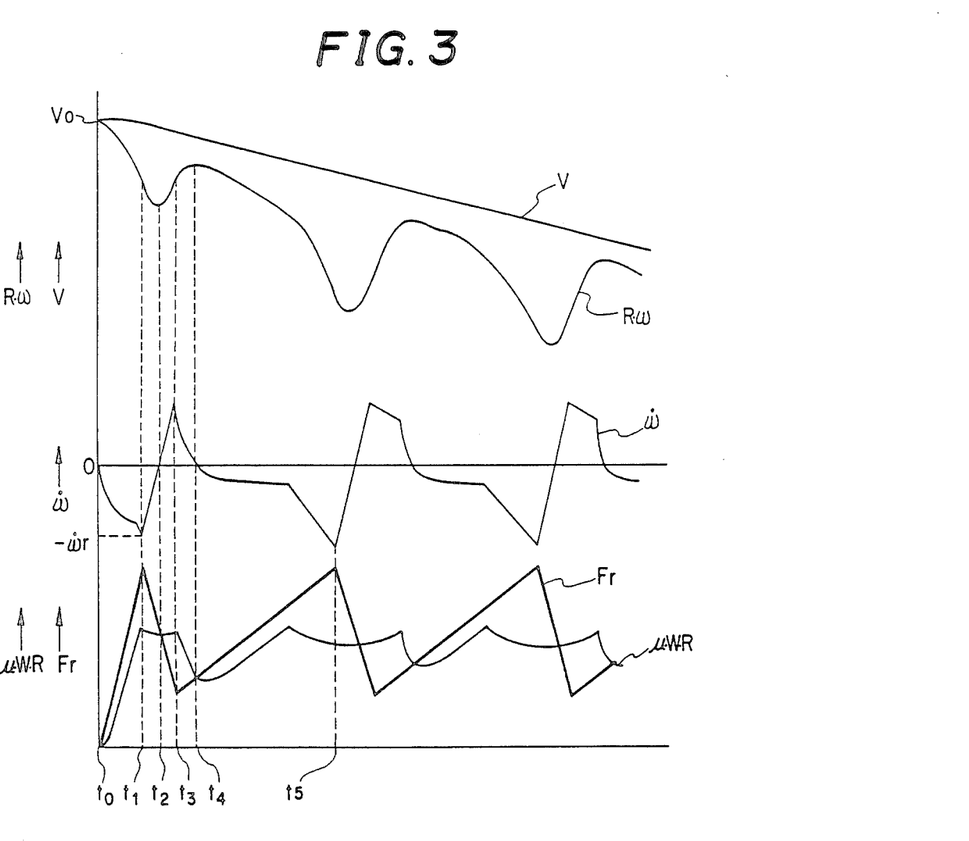
FIG. 3 is an explanatory view for the operation of the embodiment shown in FIG. 2, FIGS. 4, 5 and 6 are explanatory views for the detailed operation of the embodiment shown in FIG. 2, FIGS. 7, 8 and 9 are explanatory views for various brake torque curves.

In a case where no driving force of an engine of the vehicle is applied to the wheel 2, there is the following relationship among the brake torque Fr, tire torque $\mu \cdot W \cdot R$ and the angular acceleration $\omega$ of the wheel shown in FIG. 3:

$$I \cdot \dot{\omega} = \mu \cdot W \cdot R - Fr$$

where

W: load applied from the wheel 2 to the road surface 33

R: radius of the wheel 2

I: inertia moment of the wheel 2

In a vehicle running at a constant velocity $V_0$, when the brake pedal 30 is actuated at a constant ratio at the time t0, a fluid pressure is generated in the master cylinder 20, which is then transmitted by way of the port 27, the channel 26 and the port 28 to the brake cylinder 32 to generate a brake torque Fr to the wheel 2. Along with the increase in the brake torque Fr, the circumferential velocity $R \cdot \omega$ of the wheel 2 is gradually decreased. If the increment of the brake torque Fr is large, there arises a difference between the vehicle velocity V and the circumferential velocity $R \cdot \omega$ defined by the slip factor S. Accordingly, the tire torque $\mu \cdot W \cdot R$ at first increases together with the increase in the frictional coefficient $\mu$. At a point when the slip factor S exceeds SM the frictional coefficient $\mu$ will no longer increase. Thus, the tire torque stops its increasing tendency as well and, conversely, starts to decrease gradually.

When the brake torque Fr further increases and the angular acceleration $\dot{\omega}$ of the wheel 2 arrives at $-\omega r$ at the time t1, the differentiation circuit 3 that differentiates the voltage signal from the velocity detector 1 supplies a voltage signal corresponding to the angular acceleration $-\dot{\omega}r$ to the coincidence detection circuit 5. Then, the detection circuit 5 supplies the signal 6 to the zero-cross detection circuit 4, the time interval measuring circuit 7 and the valve drive control circuit 8. Upon receiving the signal 6, the valve drive control circuit 8 supplies an electric current to the solenoid valve 13 to set the valve in the state for communicating the pump 17 with the port 15, by which the fluid under pressure is supplied from the pump 17 to the chamber 25 and displaces the piston 21 in the direction of the arrow 23. Since the displacement of the piston 21 closes the channel 26 by the ball 24 and the fluid pressure on the side of the port 28 is decreased, the brake torque Fr is rapidly decreased. The time interval measuring circuit 7 simultaneously starts the time counting operation upon receiving the signal 6. In the course of the decrease in the brake torque Fr, when the angular acceleration $\dot{\omega}$ of the wheel 2 arrives at zero at the time t2, that is, when the brake torque Fr and the tire torque $\mu \cdot W \cdot R$ are equalized to each other, the zero-cross detection circuit 4 generates the signal 9. The time interval measuring circuit 7, upon receiving the signal 9, delivers a signal corresponding to the time interval $T1 = t2 - t1$ to the coefficient multiplier circuit 11. The multiplier circuit 11 delivers the signal from the time interval measuring circuit 7 just as it is to the time detection circuit 10, since the coefficient to be multiplied is set to 1 in this embodiment. The time detection circuit 10 starts its time counting operation after receiving the signal 9 and, simultaneously, compares the result of the time counting with the signal from the coefficient multiplier circuit 11. When the brake torque Fr is further decreased after the time t2 and the time interval $T1 = t2 - t1 = T2 = t3 - t2$ has been elapsed at the time t3, the time detection circuit 10 supplies the signal 12 to the valve drive control circuit 8. Then, the valve drive control circuit 8 stops the supply of the current to the solenoid valve 13, to set the valve in the state of communicating the port 15 and the reservoir 16 instead of the communication state between the pump 17 and the port 15. As the result, the fluid pressure in the chamber 25 is decreased and the piston 21 is displaced in the direction of the arrow 20 by the resiliency of the spring 19. This displacement increases the fluid pressure again on the side of the port 28, and the increasing fluid pressure is supplied to the brake cylinder 32. Accordingly, the brake torque Fr again increases after the time t3, and rises until the angular acceleration $\dot{\omega}$ of the wheel 2 reaches $-\dot{\omega}r$. When the angular acceleration $\dot{\omega}$ of the wheel 2 reaches to $-\dot{\omega}r$ at the time t5, the foregoing operations are repeated and these operations are carried out until the vehicle body velocity V is reduced to 0. Although, the predetermined angular acceleration $\dot{\omega}$ is assumed constant as $-\dot{\omega}r$, it may be set to a value somewhat smaller than the initial value $-\dot{\omega}4$, for instance, about 80% of the initial value or it may be variable so as to be decreased successively at a constant ratio on every cycle.

The anti-skid braking device according to this embodiment as described above, carries out the operation cycle of moderating the brake for a period of double the required time interval T1 from the time t1 when the angular acceleration $\dot{\omega}$ reaches $-\dot{\omega}r$ to the time when the angular acceleration $\dot{\omega}$ is recovered from $-\dot{\omega}r$ to zero, that is, T1+T2(T1=T2), applying the brake and then again moderating the brake upon reaching the angular acceleration $-\dot{\omega}r$. Therefore, in a case where the braking action is to be carried out at a slip factor extremely larger than the slip factor SM corresponding to the maximum frictional coefficient $\mu$M, for example, at the slip factor SA1, that is, with the frictional coefficient $\mu$A1 ($\mu$A1<$\mu$M) or, on the contrary, in a case where the braking action is to be carried out at the slip factor smaller than the slip factor SM, for instance, at the slip factor SB1, that is, with the frictional coefficient $\mu$B1 extremely smaller than the maximum frictional coefficient $\mu$M, the slip factor is shifted closer to SM at the time t5. In this way, the brake is moderated at the cycles succeeding to the initial cycle and the brake can eventually be applied successively with the frictional coefficient $\mu$ including and in the vicinity of the maximum frictional coefficient $\mu$M. As the result, locking in the wheel can be prevented and the vehicle body can be stopped within a braking distance that is shortened as much as possible. Explanation will be made to the reason why the slip factor gradually approaches the value SM in the case where the braking action is carried out with a slip factor greater than SM and a slip factor smaller than SM while referring to the drawings.

Figure 4:
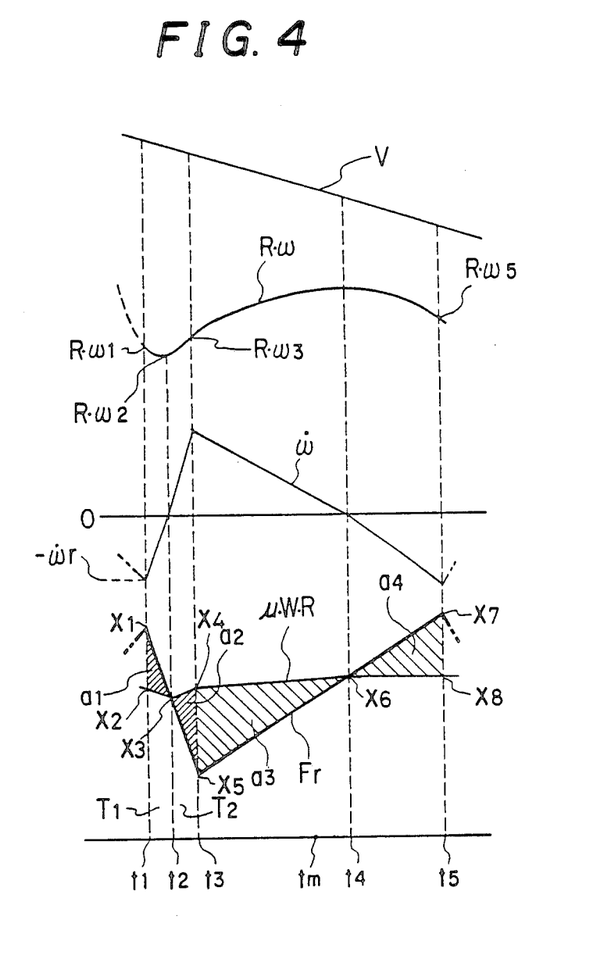
Figure 5:
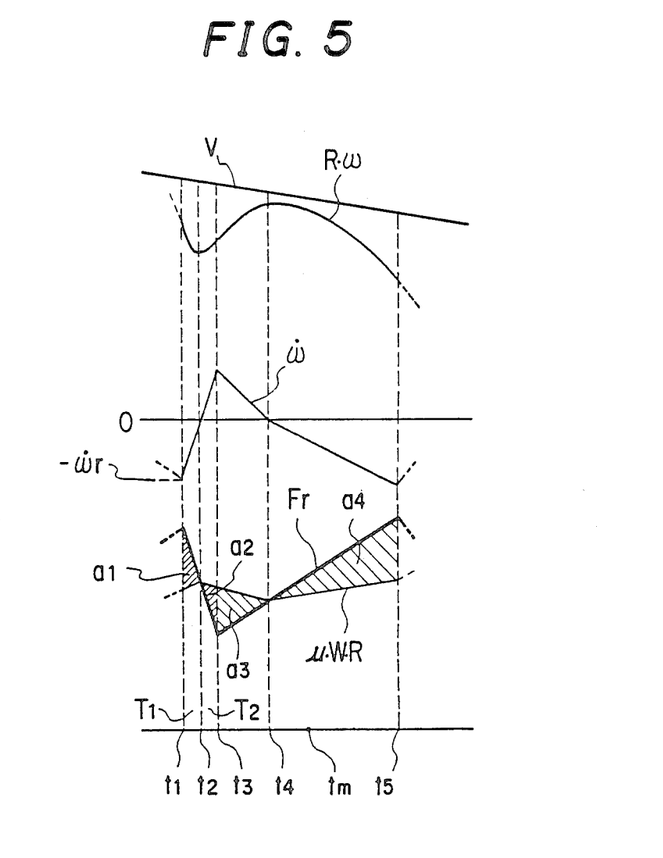

In FIGS. 4 and 5, the uppermost straight line slanted downwardly toward the right represents the change in the velocity V of the vehicle body, the curved line situated above the axis zero represents the change in the circumferential velocity R·$\omega$ of the vehicle, a saw teethlike line crossing the axis zero represents the change in the angular acceleration $\dot{\omega}$ of the wheel and the lowermost folded two lines forming triagonal regions therebetween represent the change in the tire torque $\mu$·W·R and the brake torque Fr respectively. For the sake of the explanation, the brake torque Fr is shown by a fat line.

At first, in the case where the braking action is carried out on the side in which the slip factor is larger than SM, that is, where the slip factor is SA1 at the time t1 the reason will be explained referring to FIGS. 1 and 4.

During the time t1 and the time t2, that is, in the time interval T1, since the brake torque Fr is larger than the tire torque $\mu$·W·R, the angular acceleration $\omega$ is negative and the circumferential velocity R·$\omega$ be decreased during the time interval T1. Accordingly, R·$\omega$2 is smaller than R·$\omega$1 and the slip factor for R·$\omega$1 increased to that for R·$\omega$2. As the result, the tire torque $\mu$·W·R is slightly decreased by the change in the slip factor during the time interval T1, and the brake torque Fr and the tire torque $\mu$·W·R are made equal to each other at the time t2.

On the other hand, between the time t2 and the time t3, that is, during the time interval T2, since the tire torque $\mu$·W·R is larger than the brake torque Fr, the angular acceleration $\dot{\omega}$ becomes positive and the wheel is accelerated during the time interval T2. Accordingly, the value R·$\omega$3 is larger than the value R·$\omega$2 and the slip factor for R·$\omega$3 is decreased from that for R·$\omega$2. Thus, the tire torque $\mu$·W·R slightly increases due to the change in the slip factor.

The amount of change in the circumferential velocity R·$\omega$ during the time interval T1 is in proportion to the time-integrated value for the difference between the brake torque Fr and the tire torque $\mu$·W·R, that is, to the area of the triagonal region a1 ($\Delta$X1X2X3) surrounded with the two lines of Fr and $\mu$·W·R. The amount of change in the circumferential velocity R·$\omega$ during the time interval T2 is in proportion to the area of the triagonal region a2($\Delta$X4X3X5).

Accordingly, the relationship between the magnitudes of the circumferential velocities R·$\omega$1 and R·$\omega$3 can be determined by comparing the areas of the two triagonal regions a1 and a2.

Referring to the triagonal regions a1 and a2, since they have equal height (T1=T2) and the bottom length ($\overline{X4X5}$) of the triagonal region a2 is longer than the bottom length ($\overline{X1X2}$) of the triagonal region a1 (amount of change in the $\mu$·W·R accompanying the change in the $\mu$), the trigonal region a2 has a larger area in comparison with the region a1.

Accordingly, during the time interval T1 and the time interval T2, since the amount of increase is larger than the amount of decrease in the circumferential velocity R·$\omega$ and R·$\omega$3 is situated above R·$\omega$1, the relative of the slip factor SA1>SA3 is attained.

Then, the relationship between the circumferential velocities R·$\omega$3 and R·$\omega$5 is considered in the same manner.

In this case, since the tire torque $\mu$·W·R is larger than the brake torque Fr and the angular acceleration $\dot{\omega}$ is positive between the time t3 and the time t4, the wheel is accelerated in spite of the braking action. Accordingly, the tire torque $\mu$·W·R tends to increase due to the change in the slip factor.

While on the other hand, between the time t4 at which the angular acceleration $\dot{\omega}$ is reduced to zero and the time t5 at which the angular acceleration $\dot{\omega}$ goes to $-\dot{\omega}$, the situation is reversed and the tire torque $\mu$·W·R tends to be decreased.

Comparing the area between the trigonal region a3 ($\Delta$X4X5X6) and the trigonal region a4 ($\Delta$X7X6X8), the bottom length ($\overline{X4X5}$) for the trigonal region a3 is equal to that for the trigonal region a2 and the bottom length ($\overline{X7X8}$) for the trigonal region a4 is equal to the bottom length ($\overline{X1X2}$) for the trigonal region a1 (because it is assumed that the angular acceleration $-\dot{\omega}r$ is generated at the time t1 in the same manner as at the time t5), the bottom length for the trigonal region a3 larger than that of the region a4 and, further, the height for the trigonal region a3 is also larger than that of the region a4. Accordingly, the trigonal region a3 has a larger area in comparison with the region a4.

Accordingly, since the increasing amount is smaller than the decreasing amount in the circumferential velocity R·$\omega$ between the time t3 and the time t5 and R·$\omega$5 is situated above R·$\omega$3, the relation for the slip factor: SA3>SA5 is attained.

As described above, during one cycle between the time t1 and the time t5, since the angular velocity of the wheel tends to be recovered although the velocity V of the vehicle body is decreased, a relationship: SA1>SA3>SA5 is attained for each of the slip factors at the time t1, t3, t5, whereby the slip factor tends to be decreased, that is, displaces toward SM as shown in FIG. 1.

Explanation will next be made to the case where the braking action is carried out on the side in which the slip factor is smaller than SM, that is, where the slip factor is SB1 at the time t1 while referring to FIGS. 1 and 5.

In this case, the relationship for each of the slip factors is also determined based on the relationship in the circumferential velocity R·$\omega$ at the time t1, t3 and t5 in view of their magnitude in the same manner as described above. By comparing the areas for the trigonal regions a1, a2, a3, a4 in the same manner as above, since the decreasing amount is larger than the increasing amount in the circumferential velocity R·ω and the angular velocity of the wheel tends to be decreased between the time t1 and the time t3 and also between the time t3 and the time t5, the relationship for each of the slip factors SB1<SB2<SB5 at the time t1, t3 and t5 is attained, whereby the slip factor tends to be increased, that is, it shifts in the direction approaching the value SM.

Figure 6:
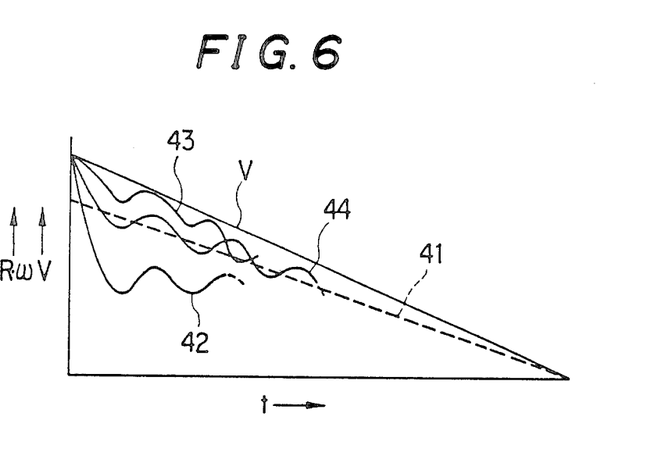

As apparent from the foregoings, braking control so as to bring the slip factor closer to SM is carried out in the vehicle braking device 40 in both of the cases where the slip factor is SA1 and SB1. As a result, the braking action is always carried out at a slip factor including the slip factor SM at the point P. In FIG. 6, the circumferential velocity R·ω is shown by the dotted line 41 where the braking action is always applied at an optimum slip factor SM. In a case if a braking action is applied as resulting in a slip factor SA1 by the vehicle braking device 40, the circumferential velocity R·ω of the wheel 2 approaches as shown in the curve 42 gradually to the circumferential velocity shown by the dotted line 41. While on the other hand, if a braking action resulting in a slip factor SB1 is applied by the vehicle braking device 40, the circumferential velocity R·ω of the wheel 2 approaches gradually to the circumferential velocity shown by the dotted line 41 in the same manner as shown by the curve 43. Then, in each of the cases, the wheel 2 is rotated at such a circumferential velocity as shown by the curve 44 situated above and below the circumferential velocity shown by the dotted line 41. The curve 44 represents the circumferential velocity of the wheel 2 in a case where the braking action is applied after the time t1 at a slip factor including the slip factor SM and the curve for the circumferential velocity R·ω previously shown in FIG. 3 approximately corresponds to the curve 44.

Figure 7:
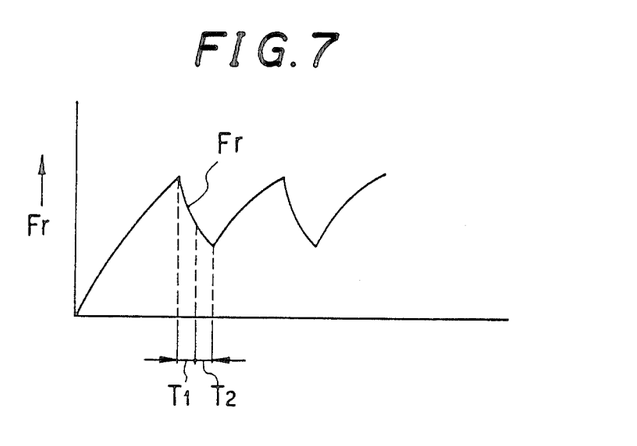
Figure 8:
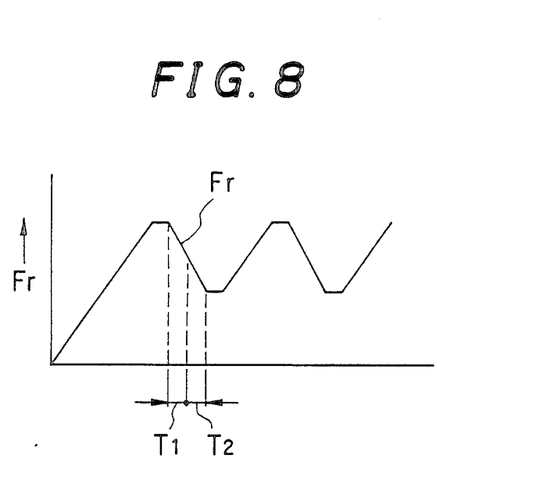
Figure 9:
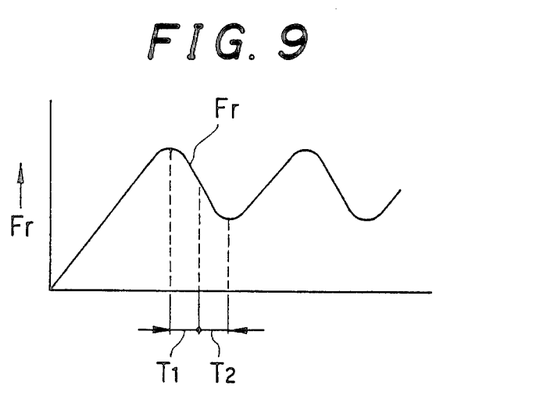

Although explanations have been made in the foregoing embodiment to the case capable of obtaining linearly increasing and decreasing brake torque Fr, this invention is also applicable to those cases, for example, as shown in FIGS. 7, 8 and 9 in which non-linear, trapezoidal or sinusoidal brake torques Fr can be obtained. Thus, in the case of obtaining the brake torque Fr as shown in FIGS. 7 to 9, the time interval may be set as: T1=mT2 with the same view as described above. Further, although the coefficient m in the coefficient multiplier circuit 11 is fixed in the foregoing embodiment, the coefficient m may be varied so that the braking action can be applied sooner with the frictional coefficient μ near the point P. Specifically, in a case where the braking action is carried out with a slip factor near the value SA1 as shown in FIG. 4, the time t4 at which the angular acceleration ω̇ is reduced to zero after the time t3 is approximately equal to the time tm (=t5+t3/2) or a time somewhat later. While on the other hand, in a case where the braking action is carried out with a slip factor near the value SB1 as shown in FIG. 5, the time t4 is also approximately equal to the time tm (=t5+t3/2) or a time somewhat earlier. Accordingly, the time tm is determined from the time t3 and the time t5 and the time t4 at which the angular acceleration ω is reduced to zero after the time t3 is also determined. Then, the period T3 (=t4−tm) is calculated. If the period T3 is a positive value greater than zero, correction is made so as to increase the coefficient m set to the coefficient multiplier circuit 11 depending on the magnitude of the period T3. The braking action after the time t5 is carried out with the corrected coefficient m and the braking control may be carried out while correcting the coefficient m as described above till the time interval corresponding to the period T3 is reduced to zero. In this way, the braking condition that has resulted the slip factor SA1 can rapidly be shifted into the condition where the slip factor SM is resulted.

Figure 10:
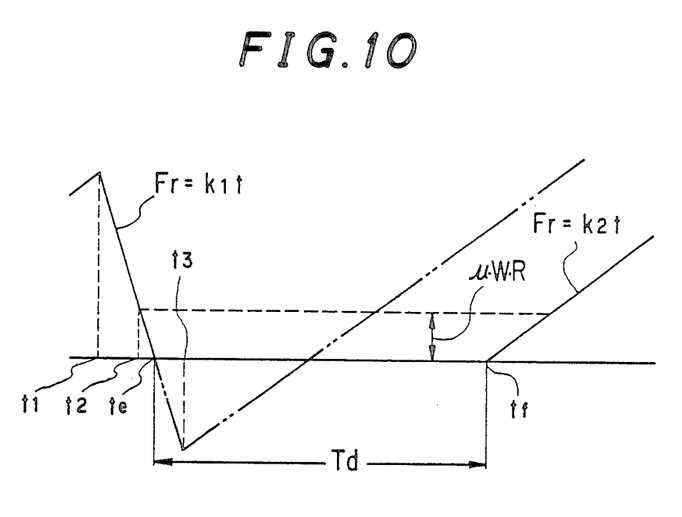
FIG. 10 is an explanatory view for the operation in one mode of the brake torque.

In addition, while the explanations have been made to the case where the brake torque Fr is reduced as desired until the time t3, if a frictional coefficient μ is extremely small as in the case on the ice, the brake fluid pressure may possibly go to zero before attaining the time t3, that is, as shown in FIG. 10, the brake torque Fr can not be lowered desirably till the time t3, and it is reduced to zero at a time te between the time t2 and the time t3. In such a case, since the angular acceleration ω̇ for the wheel 2 is made constant due to the reduction of the brake torque Fr to zero, the time te and the arrival of the brake torque Fr to zero are detected by the fact that the time differentiated value for the angular acceleration ω̇ is reduced to zero after the time t2, whereby an appropriate waiting time period Td is calculated from the previously stored increasing and decreasing characteristic values for the brake torque Fr, that is, based on the values k1 and k2. Then, the coefficient m is corrected to a larger value based on the waiting period Td so that the brake torque Fr is increased at the time tf. In this way, if the brake torque should be reduced to zero upon decreasing thereof, excess application of the braking action can be prevented and the braking condition can preferably be shifted to the state capable of obtaining the slip factor in the vicinity of the point P in the same manner as described above.

In addition, although the differentiation circuit, the coincidence detection circuit and the like are disposed individually in the foregoing embodiments, this invention is no way limited thereto but they are actually realized, for example, by using a microcomputer. Further, the operations for the differentiation, detection and time measurement can be carried out either analog or digital manner, which may be selected properly upon practice.

As described above according to this invention, since the moderation time interval in which the braking force is moderated by the moderation means is attained by adding a time interval obtained by multiplying a reference time interval measured by the measuring means with a predetermined coefficient to the reference time interval, the braking action with a larger slip factor or extremely smaller slip factor can be controlled automatically to a braking action approximately at an optimum slip factor, whereby the lockings to the wheel can be prevented effectively even if the change in the viscosity of the brake fluid or the change in the frictional coefficient should be resulted and the braking distance can be shortened as much as possible.

What is claimed is:

1. An anti-skid braking device for use in a vehicle, comprising:
   first means for supplying a braking force to a wheel of the vehicle;
   second means for detecting an angular acceleration of said wheel to thereby deliver an acceleration signal representing an angular acceleration of said wheel;
   third means, connected to said second means, for generating a first signal when said acceleration signal received from said second means has a value that corresponds to a predetermined negative angular acceleration value during supply of the braking force to the wheel by said first means, and for generating a second signal when said acceleration signal from said second means has a value higher than said predetermined negative angular acceleration;

fourth means, connected to said third means, for measuring a reference time interval which corresponds to a duration between a first time at which the fourth means receives said first signal from said third means, and a second time at which said fourth means receives said second signal from said third means, for obtaining another time interval by multiplying said reference time interval by a predetermined coefficient and for delivering a third signal after an elapse of said another time interval from an occurrence of said second signal; and fifth means, connected to said third and fourth means, for receiving said first and third signals, and connected to said first means for moderating the braking force for a moderation time interval between a reception time of said first signal and that of said third signal;

said predetermined coefficient being so predetermined that with respect to an actual frictional coefficient at a commencement time of a preceding moderation time interval, an actual frictional coefficient at a commencement time of a moderation time interval subsequent to said preceding moderation time interval approaches a maximum value of an actual frictional coefficient in one anti-skid operation of said device.

2. The anti-skid braking device according to claim 1, wherein said second means includes sixth means for differentiating an angular velocity of the wheel with respect to time, to thereby deliver said acceleration signal.

3. The anti-skid braking device according to claim 2, in which said third means comprises seventh means, connected to said sixth means, for detecting a coincidence between said first value and the received acceleration signal to thereby issue said first signal, and eighth means connected to the sixth means for detecting a coincidence between said second value and the received acceleration signal, to thereby deliver said second signal.

4. The anti-skid braking device according to claim 3, in which the fourth means comprises ninth means connected to said seventh and eighth means for determining said reference time interval based on the first signal received from the seventh means and the second signal received from the eighth means to thereby deliver a fourth signal indicating said reference time interval, tenth means connected to said ninth means for calculating said another time interval by multiplying the fourth signal received from the ninth means by said predetermined coefficient to thereby issue a fifth signal indicating said another time interval, and eleventh means connected to said eighth means and said tenth means for detecting lapse of said another time interval corresponding to said fifth signal received from said tenth means from a time of reception of said signal from said eighth means to thereby deliver said third signal.

* * * * *